(No Model.)
D. CRONIN.
FIRE ESCAPE.
No. 584,625. Patented June 15, 1897.
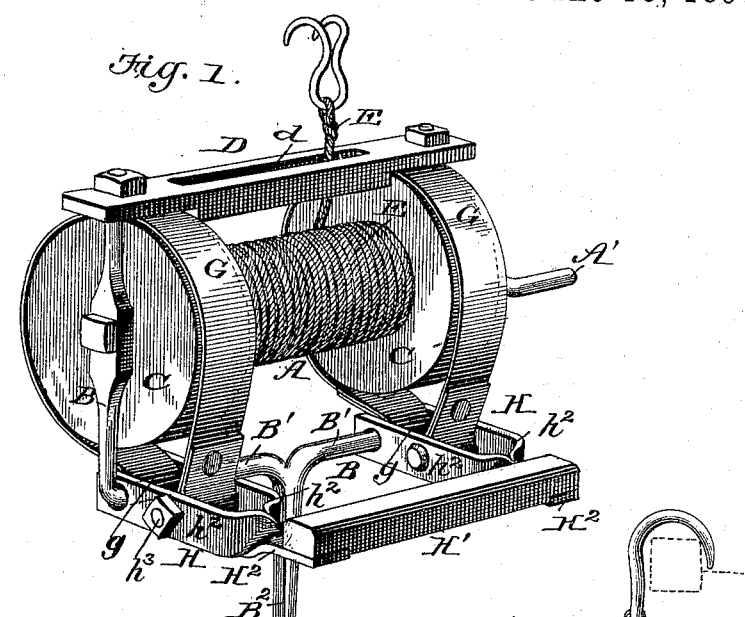
Fig. 1.
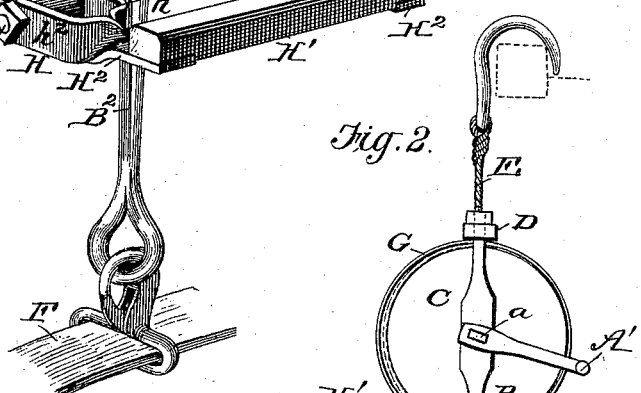
Fig. 2.
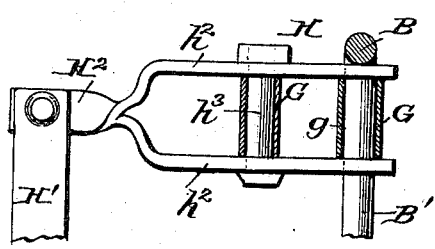
Fig. 3.
WITNESSES:
Jos. A. Ryan
P. B. Turpin
INVENTOR
Daniel Cronin
BY Munn & Co.
ATTORNEYS.

UNITED STATES PATENT OFFICE.

DANIEL CRONIN, OF MANNINGTON, WEST VIRGINIA.

FIRE-ESCAPE.

SPECIFICATION forming part of Letters Patent No. 584,625, dated June 15, 1897.

Application filed March 15, 1897. Serial No. 627,528. (No model.)

*To all whom it may concern:*

Be it known that I, DANIEL CRONIN, residing at Mannington, in the county of Marion and State of West Virginia, have invented a new and useful Improvement in Fire-Escapes, of which the following is a specification.

My invention is an improvement in fire-escapes, and has for an object to provide an escape including simple and efficient means for braking the rope-drum.

The invention has for further objects other improvements; and it consists in novel constructions and combinations of parts, as will be hereinafter described, and pointed out in the claims.

In the drawings, Figure 1 is a perspective view of my fire-escape. Fig. 2 is a side view thereof; and Fig. 3 is a detail view, part in section.

The apparatus includes a drum A, journaled in the main frame B and having at its ends the wheels or disks C for the brake-straps.

The main frame B projects above the disks C, and to the said frame B is fixed a guide-bar D, which has a longitudinal slot $d$ extending from end to end above the drum A and forming a passage for the rope or wire E. At one or both ends the drum A has an angular stem $a$ to receive a crank-handle A', by which the drum may be turned to wind the rope or wire thereon, and it is manifest the escape may be reversed and the wire or rope be wound in either direction on the drum A.

Below the wheels or disks the main frame is bent inwardly, forming the horizontal arms B', from which at a point below the middle of the drum the hanger-arm B², supporting the belt or seat strap F, extends as shown. The brake-straps G are secured at one end $g$ to the arms B' of the frame B and are passed thence around the disks C and are secured at their other ends to the brake-setting frame H. This frame H is of a special construction, being provided with a handle-bar H' and arms H², each of which is bifurcated, forming the branches $h^2$, which are pivoted near their extremities on the arms B' of the frame B and lie at such extremities on opposite sides of the brake-straps, where the latter are secured to the said arms B' in such manner as to keep the said ends of the brake-strap in proper position in alinement with the wheels or disks C. At the same time the other or free ends of the brake-straps are secured between the arms or branches $h^2$ of the arms H² and are held thereby in proper position, being preferably secured upon a bolt $h^3$, extending between the branches $h^2$.

By the described construction an escaping person seated in the strap F can, by grasping the handle-bar H', apply the brake with great force and so regulate his descent to the ground.

I may use a rope or a wire line, if desired, such line being secured at one end to the drum and passed up through the slot $d$ and having at its other end a strong hook or other device by which it may be made fast to the window-sill or to any other suitable supporting object.

Having thus described my invention, what I claim, and desire to secure by Letters Patent, is—

1. The improved fire-escape herein described consisting of the drum, the main frame having bearings for said drum and provided above the same with a cross-bar having a longitudinal slot or passage for the rope, said main frame being provided below the drum with inwardly-projecting arms having the hanger-arms at their inner ends, the brake-setting frame having its arms bifurcated and the branches or forks thereof spaced apart and pivoted on the lower inwardly-projecting arms of the main frame and the brake-straps held at one end to the main frame between the branches of the brake-setting frame and connected at their other ends with said brake-setting frame substantially as described.

2. In a fire-escape substantially as described the combination of the drum, the main frame having side bars supporting the drum and inwardly-projecting arms below said drum, the brake-setting frame having its arms bifurcated and the branches or forks thereof spaced apart and pivoted on the main frame, and the brake-straps connected at one end to the brake-frame between the branches thereof, and at their other ends to the inwardly-projecting arms of the main frame between said branches of the brake-setting frame substantially as described.

DANIEL CRONIN.

Witnesses:
W. J. BARNES,
F. J. KEARMEY.